United States Patent
Wu et al.

(10) Patent No.: US 8,205,059 B2
(45) Date of Patent: Jun. 19, 2012

(54) BUFFER MANAGEMENT METHOD AND OPTICAL DISC DRIVE

(75) Inventors: Tse-Hong Wu, Hsinchu (TW);
Shih-Hsin Chen, Hsinchu County (TW);
Shih-Ta Hung, Taoyuan County (TW);
KuanYu Lai, Changhua County (TW);
Tai-Liang Lin, Keelung (TW);
Ping-Sheng Chen, Chiayi County (TW)

(73) Assignee: Mediatek Inc., Hsin-Chu (TW)

( * ) Notice: Subject to any disclaimer, the term of this patent is extended or adjusted under 35 U.S.C. 154(b) by 558 days.

(21) Appl. No.: 12/032,719

(22) Filed: Feb. 18, 2008

(65) Prior Publication Data

US 2008/0198706 A1   Aug. 21, 2008

Related U.S. Application Data

(60) Provisional application No. 60/890,204, filed on Feb. 16, 2007.

(51) Int. Cl.
   *G06F 12/00* (2006.01)
(52) U.S. Cl. ............ 711/170; 711/135; 710/11; 710/39; 710/57
(58) Field of Classification Search ............ 711/112
   See application file for complete search history.

(56) References Cited

U.S. PATENT DOCUMENTS

| | | | |
|---|---|---|---|
| 5,408,654 A | 4/1995 | Barry | |
| 5,860,089 A | 1/1999 | Ishii | |
| 5,892,937 A | 4/1999 | Caccavale | |
| 6,330,640 B1 | 12/2001 | Williams et al. | |
| 6,336,150 B1 | 1/2002 | Ellis et al. | |
| 6,357,030 B1 | 3/2002 | Demura et al. | |
| 6,412,045 B1 * | 6/2002 | DeKoning et al. | ............ 711/135 |
| 6,480,936 B1 | 11/2002 | Ban et al. | |
| 6,513,142 B1 | 1/2003 | Noya | |
| 6,516,380 B2 | 2/2003 | Kenchammana-Hoskote et al. | |
| 6,725,329 B1 | 4/2004 | Ng et al. | |
| 6,798,599 B2 | 9/2004 | Dykes et al. | |

(Continued)

FOREIGN PATENT DOCUMENTS

TW    I256041    6/2006

OTHER PUBLICATIONS

English language translation of abstract of TW I256041 (published Jun. 1, 2006).

*Primary Examiner* — Matthew Bradley
*Assistant Examiner* — Kalpit Parikh
(74) *Attorney, Agent, or Firm* — Thomas|Kayden

(57) ABSTRACT

An optical disc drive is provided, mainly comprising a buffer, a processor and a driving module for accessing an optical disc. The optical disc drive receives a plurality of write commands. Each write command comprises a data block and a destination address. The buffer buffers data blocks to be recorded to the optical disc with corresponding write commands in either a random mode or a sequential mode. The processor schedules a recording operation based on the write commands, and selectively switches the buffer to the random mode or to the sequential mode based on arrangements of data blocks buffered in the buffer. The driving module is controlled by the processor to perform the recording operation, whereby the data blocks are recorded to the optical disc when a start recording condition is met. Specifically, the start recording condition varies with the random or sequential modes.

16 Claims, 19 Drawing Sheets

U.S. PATENT DOCUMENTS

| | | |
|---|---|---|
| 6,845,405 B1 * | 1/2005 | Thelin .............................. 710/6 |
| 6,871,272 B2 | 3/2005 | Butterworth |
| 6,907,499 B2 | 6/2005 | Herbst et al. |
| 6,940,796 B2 | 9/2005 | Ariyama |
| 6,944,717 B2 | 9/2005 | Yoneyama et al. |
| 6,988,165 B2 | 1/2006 | White et al. |
| 7,392,340 B1 | 6/2008 | Dang et al. |
| 7,738,329 B2 | 6/2010 | Wu et al. |
| 7,913,034 B2 * | 3/2011 | Calvignac et al. ............ 711/105 |
| 2007/0283086 A1 * | 12/2007 | Bates ........................... 711/113 |

* cited by examiner

| Block Index | Next Index | Previous Index |
|---|---|---|
| 1 | 3 | N/A |
| 2 | N | 6 |
| 3 | 6 | 1 |
| 4 | N/A | N |
| 5 | 7 | N/A |
| 6 | 2 | 3 |
| 7 | N-1 | 5 |
| ... | ... | ... |
| N-1 | N/A | 7 |
| N | 4 | 2 |

BUFFER MANAGEMENT METHOD AND OPTICAL DISC DRIVE

CROSS REFERENCE TO RELATED APPLICATIONS

This application claims the benefit of U.S. Provisional Application No. 60/890,204 filed on Feb. 16, 2007.

BACKGROUND OF THE INVENTION

1. Field of the Invention

The invention relates to optical disc drives, and in particular, to buffer management in random access optical discs.

2. Description of the Related Art

Writable optical disc technologies have been highly developed, and there are various standards such as CD-R, CD-RW, DVD-R, DVD+R, DVD-RW, DVD+RW, DVDRAM, HDDVD and Blue-Ray that allow data to be recorded onto a disc. FIG. 1 shows a conventional optical disc drive 120 coupled to a host computer 110. The host computer 110 may issue certain read or write commands to access an optical disc (not shown) installed in the optical disc drive 120. A typical read command comprises one or more destination addresses where data blocks are requested, and a write command also comprises specific one or more destination addresses where one or more data blocks are designated to be recorded thereto. Data blocks to be recorded may send from the host computer 110 in conjunction with the write commands. The optical disc drive 120 basically comprises a processor 122, a memory device 124 and a driving module 126. The memory device 124 is usually separated into two areas, a read buffer 130 and a write buffer 132. The read buffer 130 buffers data blocks acquired from the optical disc in response to the read commands. On the other hand, the write buffer 132 buffers data blocks to be recorded onto the optical disc. The driving module 126 include a mechanical unit comprising a pick up head (PUH), a motor and other controlling means (not shown) to perform physical data access of the optical disc.

Due to the spinning nature of the optical disc, a conventional recording operation can be performed easily in sequential mode, whereby data blocks buffered in the write buffer 132 are recorded sequentially according to their destination addresses. Some random access technologies have been proposed, allowing random recording of the optical disc. However, random recording is very inefficient for the driving module 126 because track seeking and locking consumes significant time. To improve efficiency, various buffer management methods are provided. For example, the write buffer 132 may be divided into a plurality of sections 134 each corresponding to a destination address. Each section 134 serves as a ring buffer to cache data blocks of adjacent destination addresses. In other word, it is better that buffered data blocks should have continuous destination addresses. In this way, data blocks with consecutive destination addresses have higher probability to be gathered, so the mechanical operations of track seeking and locking can be reduced to smoothen randomness of PUH moves. Since the scale of disc address is much larger than the buffer size, the effect is limited under very random and frequent disc access operations. It is therefore desirable to propose an enhanced buffer management method.

BRIEF SUMMARY OF THE INVENTION

An embodiment of an optical disc drive is provided, mainly comprising a buffer, a processor and a driving module for accessing an optical disc. The buffer buffers data blocks to be recorded to the optical disc with corresponding write commands in either a random mode or a sequential mode. The processor schedules a recording operation based on the write commands, and selectively switches the buffer to the random mode or to the sequential mode based on arrangements of data blocks buffered in the buffer. The driving module is controlled by the processor to perform the recording operation, whereby the data blocks are recorded to the optical disc upon a start recording condition is met. Specifically, the start recording condition varies with the random or sequential modes.

The processor analyzes arrangements of data blocks in the buffer to organize data blocks with consecutive destination addresses into a disc write task, and counts a total of disc write tasks as a task number. According to the task number, the mode is decided. When the task number exceeds one, the buffer is switched to random mode. Alternatively, when the task number is zero, the buffer is switched to sequential mode. Furthermore, when the task number is one, the processor determines whether an incoming write command has a destination address consecutive to those in the disc write task. If so, the buffer is switched to sequential mode, otherwise to random mode.

The start recording condition comprises buffer fullness, an idle time from last activity of the buffer, duration since the last recording operation was performed, or total number of disc write tasks. In random mode, the start recording condition is met when the processor determines the buffer fullness is smaller than a first capacity threshold, the idle time exceeds a first idle threshold, the duration exceeds a first duration threshold, or the number of disc write tasks exceeds a first task threshold. Conversely, in sequential mode, the start recording condition is met when the processor determines the buffer fullness is smaller than a second capacity threshold, the idle time exceeds a second idle threshold, or the duration exceeds a second duration threshold. The first capacity threshold is smaller than the second capacity threshold, the first idle threshold is larger than the second idle threshold, the first duration threshold is larger than the second duration threshold.

Another embodiment is a buffer management method deployed in the described optical disc drive. A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 4 shows an embodiment of a link list;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
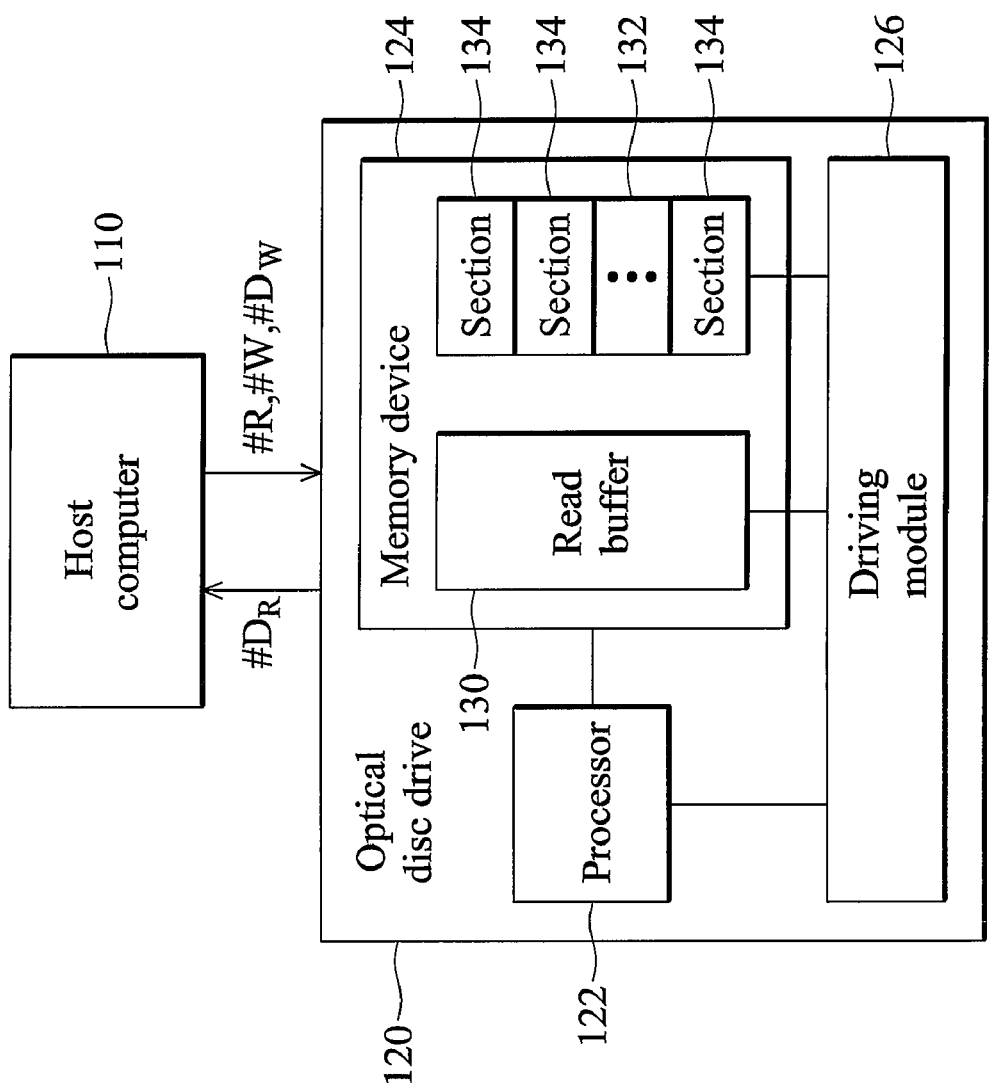
FIG. 1 shows a conventional optical disc drive.
Figure 2A:
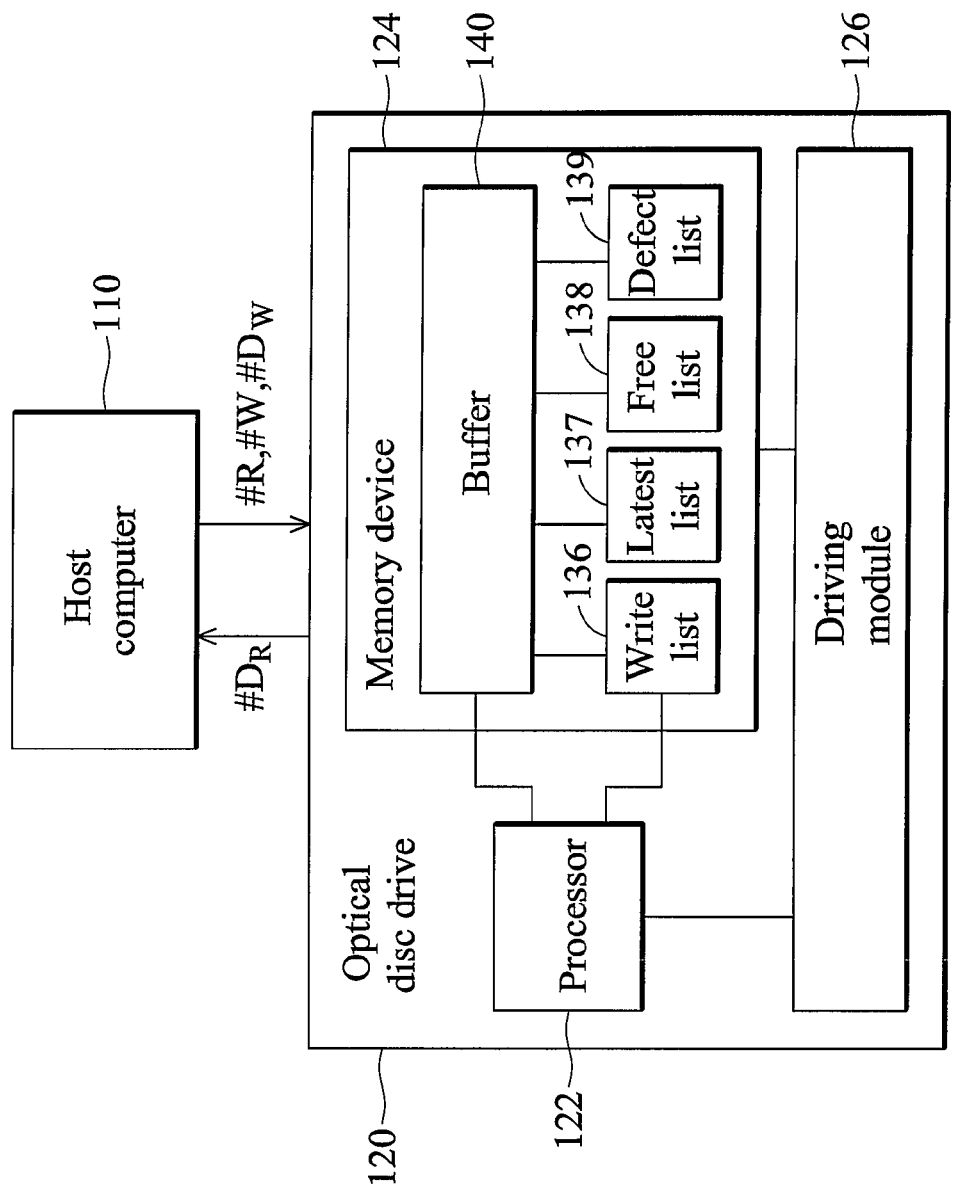
FIG. 2a shows an embodiment of an optical disc drive according to the invention.

FIG. 2a shows an embodiment of an optical disc drive according to the invention. While a processor 122 processes read and write commands #R and #W issued from the host computer 110, a buffer 140 is deployed in the memory device 124 to temporarily store associated data blocks. Data blocks requested by the read command #R are referred to as read data block #$D_R$, whereas those associated with write commands #W are write data blocks #$D_W$. The buffer 140 is partitioned into several blocks. Each block serves as a unit for data storage. And several blocks are collected as a section. The buffer 140 serves as a cache to store the read data block #$D_R$ and the write data block #$D_W$, and in the embodiment, a buffer management system and approach is disclosed to optimize a recording operation using management tables, such as a write list 136, a latest list, a defect list and a free list 138. The driving module 126 is accordingly controlled to perform the recording operation. When a start recording condition is met, the data blocks in the buffer 140 are transferred and recorded to the optical disc.

When the optical disc drive 120 receives a write command #W designated to record one or more write data blocks #$D_W$ onto the optical disc, the write data blocks #$D_W$ are first buffered in the memory device 124 before the physical recording operation is performed. And the write list 136, the latest list and free list 138 are updated accordingly. The write list 136 serves as a lookup table for maintaining relationship of all write data blocks #$D_W$ buffered in the buffer 140. Likewise, the free list 138 serves as another lookup table containing unallocated blocks of the buffer 140 that direct to free spaces or available spaces. Furthermore, a latest list 137 is provided to maintain blocks of latest accessed data blocks in the buffer 140, and a defect list 139 is used to maintain blocks of those failed to be recorded onto the optical disc. The write list 136, latest list 137, free list 138 and defect list 139 may be established by tables, but other data structure such as link list also adaptable. Implementations of the proposed architecture of FIG. 2a are further described in the embodiments hereafter.

Figure 2B:
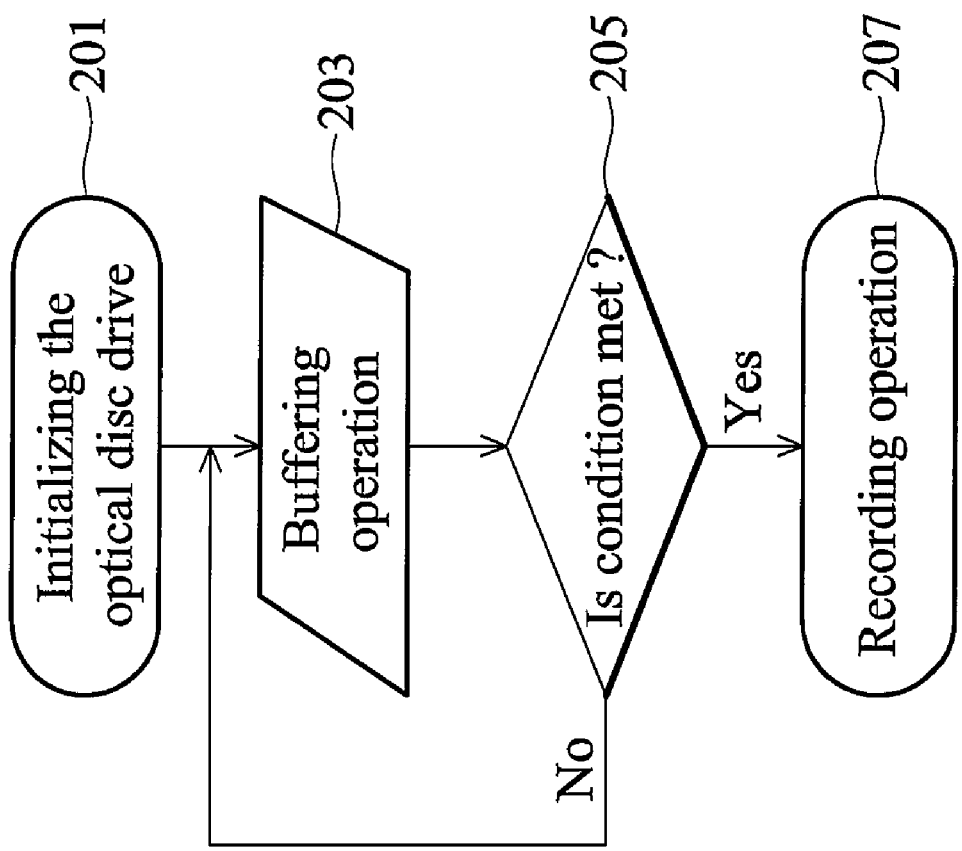
FIG. 2b is a flowchart of an embodiment of buffer management method according to the invention.

FIG. 2b is a flowchart of an embodiment of buffer management method according to the invention. The fundamental steps are summarized into steps 201 to 207. In step 201, the optical disc drive 120 is initialized. After initialization, a buffering operation is recursively processed in step 203. The buffering operation buffers write data blocks #$D_W$ transferred from the host 110 according to the write command #W. Meanwhile, the buffering operation also buffers read data blocks #$D_R$ transferred from the optical disc according to the read command #R. In step 205, a start recording condition is checked. Only when the start recording condition is met, the optical disc drive 120 enters a physical recording operation in step 207. Otherwise the process loops back to step 203.

While the buffering operation is being processed, the host computer 110 may randomly issue read commands #R or write commands #W designated to request certain read data blocks #$D_R$ from the optical disc, or to record write data blocks #$D_W$ onto the optical disc. The read and write data blocks #$D_R$ and #$D_W$ may be buffered into buffer 140. And the write list 136, latest list 137 and free list 138 are updated accordingly for maintenance thereof. It is well known, continuity of data blocks is excessively desirable when performing the recording operation. In the embodiment, a recording operation which successively record at least one write data blocks #$D_W$ onto consecutive destination area of the optical disc is defined as a disc write task. To minimize the seeking operation and to maximize performance of a recording operation, the processor 122 collects unrecorded data blocks having consecutive destination addresses and successively records those collected data blocks onto the optical disc in a disc write task.

Figure 3A:
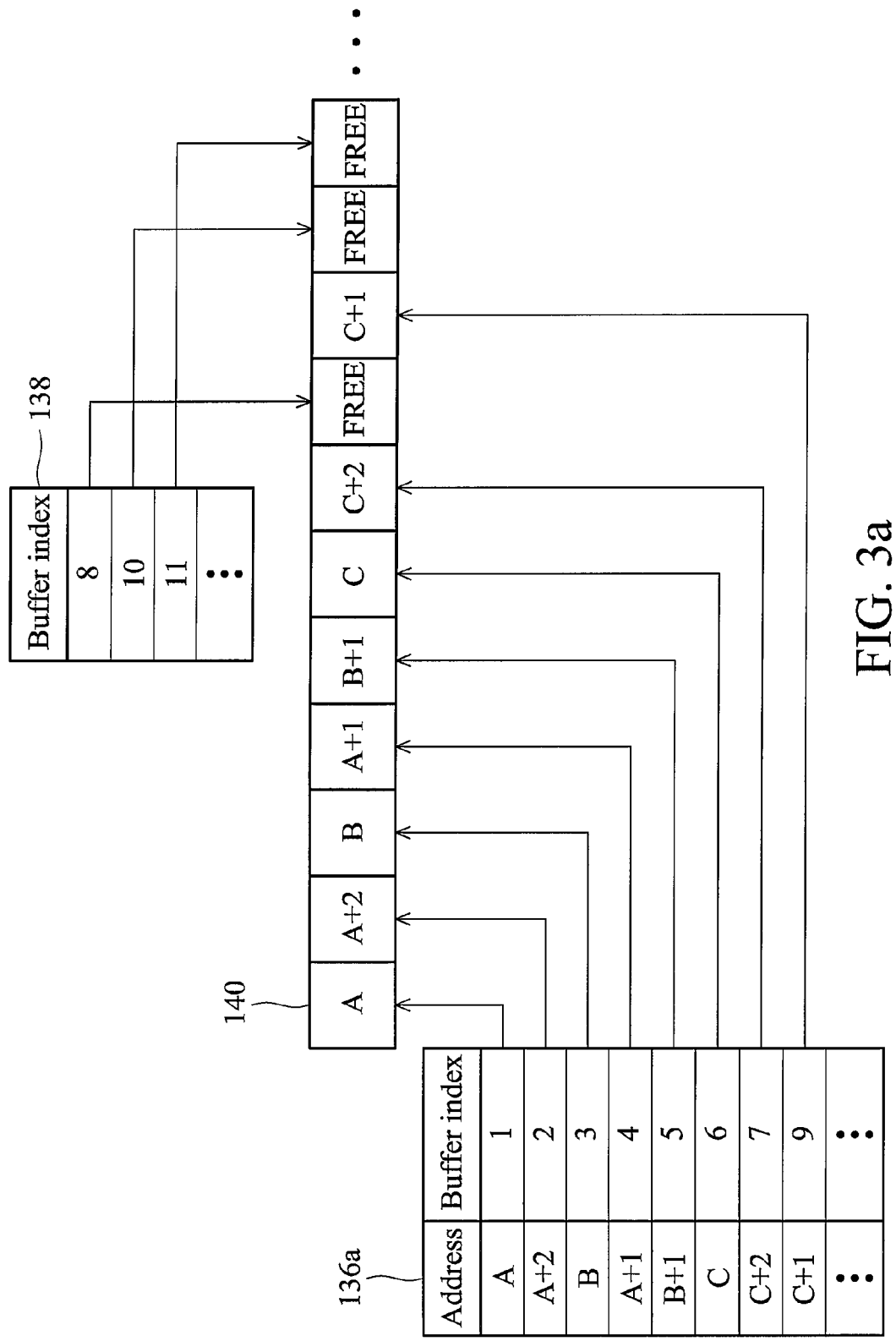
FIG. 3a shows an embodiment of a write list and a free list.

Specifically, the write list 136 is created from the buffer 140, and contents of write list 136 are utilized to assistance in establishing the disc write tasks. FIG. 3a shows an embodiment of a write list 136a and a free list 142. In FIG. 3, a plurality of data blocks are stored in the buffer 140. The labels of A, B and C in each block denotes destination addresses of the certain write data blocks #$D_W$. As shown, there are pluralities of write data blocks #$D_W$ stored in the buffer 140, in which those of consecutive destination addresses are categorized into one disc write task. As an example, addresses denoted as A, A+1 and A+2 are discovered and categorized into a first disc write task. Likewise, the write data blocks #$D_W$ of destination addresses denoted as B and B+1, and C, C+1 and C+2 can construct two other disc write tasks. It is shown that the write list 136a includes buffer index and corresponding destination addresses of the write data blocks #$D_W$. Although the write data blocks #$D_W$ may be distributed randomly in different blocks of the buffer 140. With the write list 136a, when an incoming write data block #$D_W$ is received, it can be easily determined whether the incoming write data block #$D_W$ corresponding to any of the existed disc write tasks. As shown, free blocks or available blocks of the buffer 140 denoted as "FREE" are maintained by the free list 138.

Figure 3B:
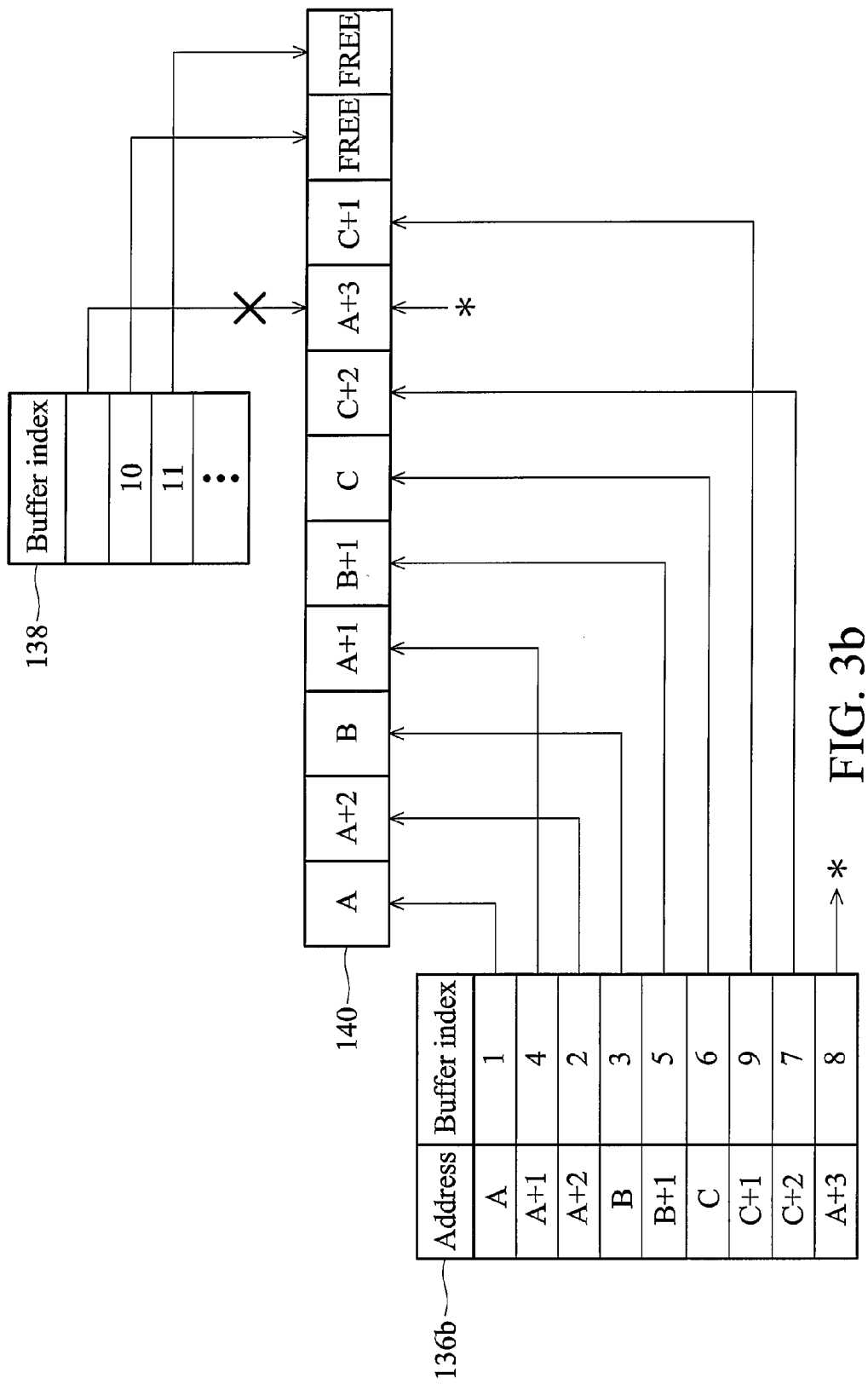
FIG. 3b shows another embodiment of a write list.

FIG. 3b shows another embodiment of a write list 136b. The write list 136b is a sorted version of write list 136a in FIG. 3a, in which elements are rearranged based on destination addresses of the write data block #$D_W$. Since the write list 136b is implemented in the memory device 124, the cost of sorting the contents is ignorable while manageability of the write list 136b is thereby increased. For example, if an incoming write data block #$D_W$ denoted as "A+3" is input, one of the free entries in the free list 138, such as "FREE1", is assigned for storage of it, and in the write list 136b, an additional column is appended to record its destination address "A+3" and a pointer pointing to its newly assigned entry. In another embodiment, the write list 136b with the newly added entry "A+3" could be further sorted to be an updated write list.

FIG. 4 shows an embodiment of a link list 400. In practice, the data structure of the buffer 140 can be implemented with a link list. A link list has various types, basically a forward type and a backward type. In a link list of forward type, each element itself is associated with a next index pointing to an address where the next element is located. Alternatively, in a link list of backward type, each element itself is bound with a previous index to indicate where a previous element is located. The advantage of link list is, there is no need to sort the elements, and in addition, costs of adding or removing an element is almost ignorable since only relative indices need to be changed. Practically, the forward and backward types can be simultaneously implemented to form a bi-directional link list.

Figure 5A:
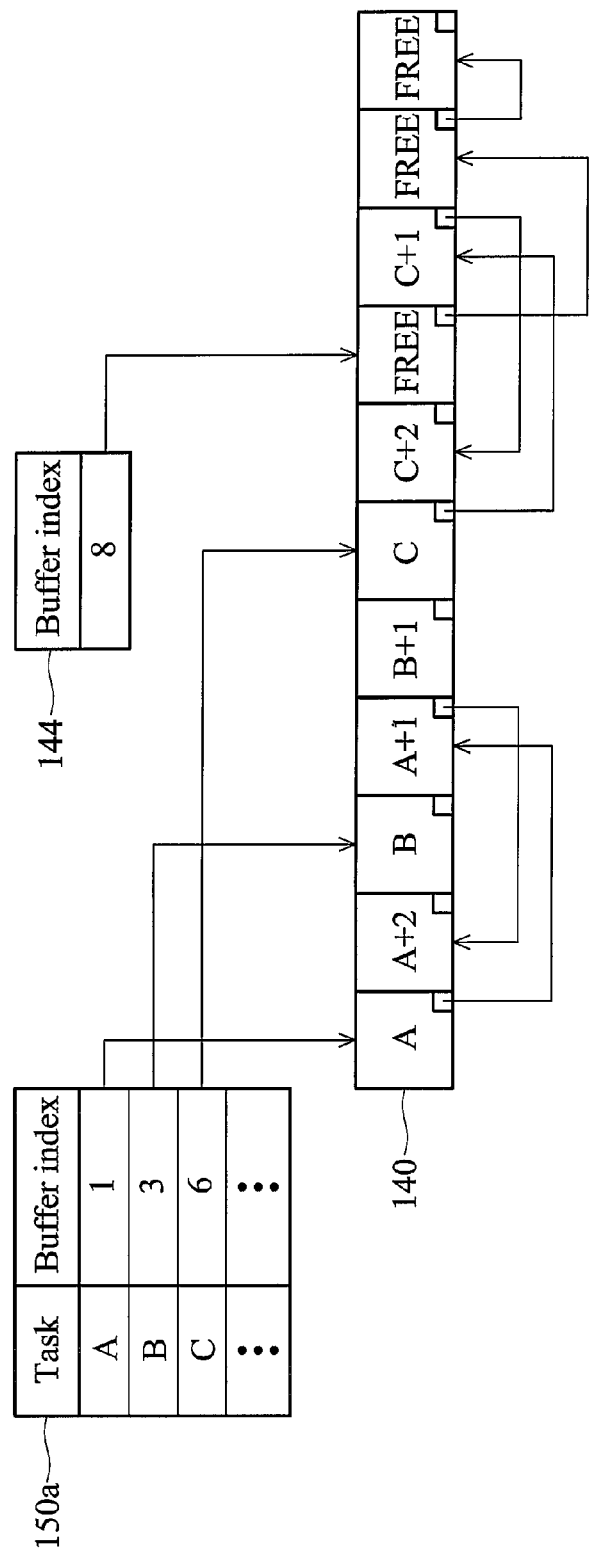
FIG. 5a show embodiments of a buffer using a forward type link list.

The architecture of the link list can be adapted to enhance the embodiments in FIGS. 3a and 3b. FIG. 5a show embodiments of a buffer 140 using a forward type link list. The write list 150a maintains several disc write tasks by recording their task entries. A task entry indicates where a first write data block #$D_W$ of the disc write task is buffered. In the buffer 140, each block is bound with a pointer linking to another block. For example, for the disc write task A, its task entry points to where write data block #$D_W$ with a beginning designation addresses A locates, and the write data block #$D_W$ A has a pointer linking to a successive write data block #$D_W$ with a designation addresses A+1. Likewise, the pointer in write data block #$D_W$ A+1 links to a following write data block #$D_W$ with another designation addresses A+2. Free spaces in the buffer 140 can also be managed in this way. The free list 144 only records an entry indicating a first free block, and through a pointer, its successions are linked. The link list structure facilitates data additions and removals, while complexities of managing the write list 150a and free list 144 are also reduced.

Figure 5B:
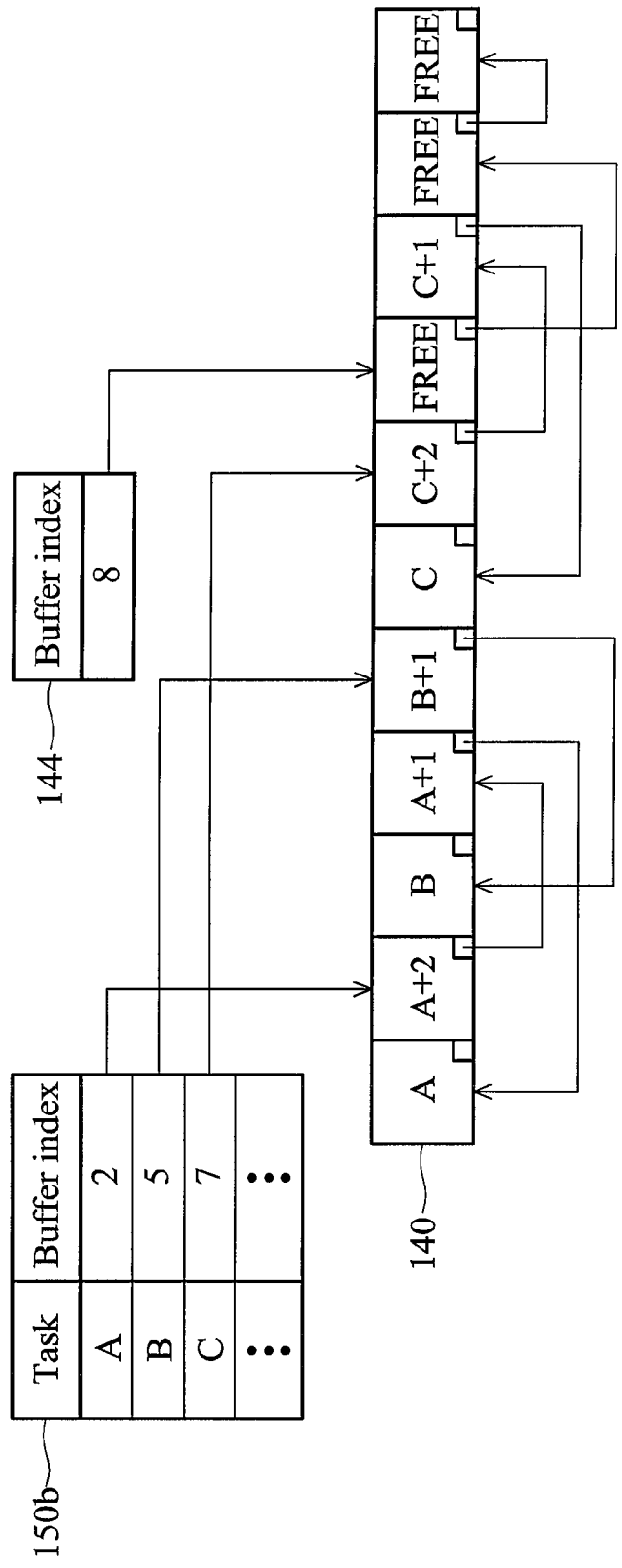
FIG. 5b shows another embodiment of a write list.

FIG. 5b shows another embodiment of a write list 150b. A backward type link list is used, and the mechanism is very similar to the embodiment of FIG. 5a except for the pointer directions. The task entry in write list 150b indicates where a last write data block #$D_W$ of the disc write task is buffered. Taking disc write task A as an example, the last write data block #$D_W$ with destination address A+2 is located at block index "2", and the write data block #$D_W$ A+2 has a pointer linking to a previous write data block #$D_W$ A+1. Likewise, the pointer in the write data block #$D_W$ A+1 links to write data block #$D_W$ A.

Figure 6A:
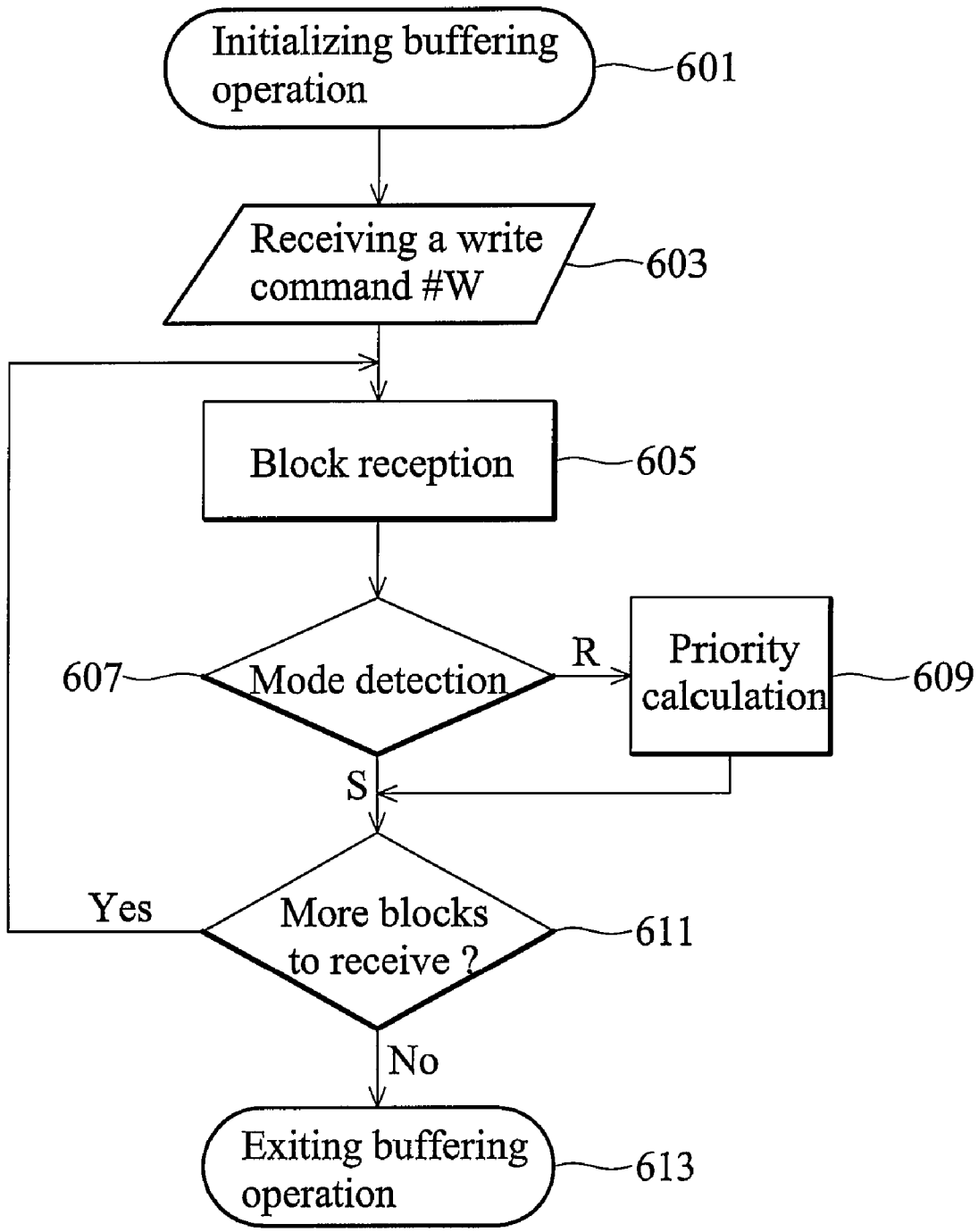
FIG. 6a is a flowchart of an embodiment of a buffering operation.

FIG. 6a is a flowchart of an embodiment of a buffering operation. The buffering operation in step 203 of FIG. 2b, in detail, further comprises a plurality of steps. In step 601, when the buffering operation of step 203 is initialized, write commands #W are randomly issued from the host computer 110 and handled in different procedures. Step 603 discusses when a specific write command #W is received, a block reception procedure is performed in step 605 to store its corresponding write data blocks #$D_W$ into the buffer 140. A detailed embodiment of the block reception is described in FIG. 6b.

Upon completion of receiving a write data block #$D_W$, a mode detection procedure is triggered in step 607. In the embodiment, the optical disc drive 120 supports two modes when buffering the write data block #$D_W$ and the read data blocks #$D_R$. One is the conventional sequential mode, and the other is a random mode. Assume the arrangement of all buffered write data block #$D_W$ conforms to a conventional sequential structure, it is more efficient to record the write data blocks #$D_W$ in sequential access mode. However, when destination addresses of the buffered write data blocks #$D_W$ are not continuous, the recording operation is more complex, thus, it is processed in random mode in which various approaches such as disc write tasks are used to optimize the performance. The determination of the modes is described in an embodiment in FIG. 6c.

If random mode is set in step 607, a plurality of disc write tasks will be established. To schedule the disc write tasks, priorities of each disc write task are required. A priority calculation process is therefore executed in step 609 to prioritize all disc write tasks. The priorities may be determined by various buffer statuses of each disc write task, and a detailed embodiment is described in FIG. 6d.

One write command #W may be associated with more than one write data block #$D_W$. In step 611, it is determined whether write data block #$D_W$ corresponding to a write command #W are pending buffered in the buffer 140. If yes, the process loops back to step 605 for buffering another data blocks. Otherwise, the buffering operation is concluded, followed by a start recording condition determination process as described in step 205 of FIG. 2b.

Figure 6B:
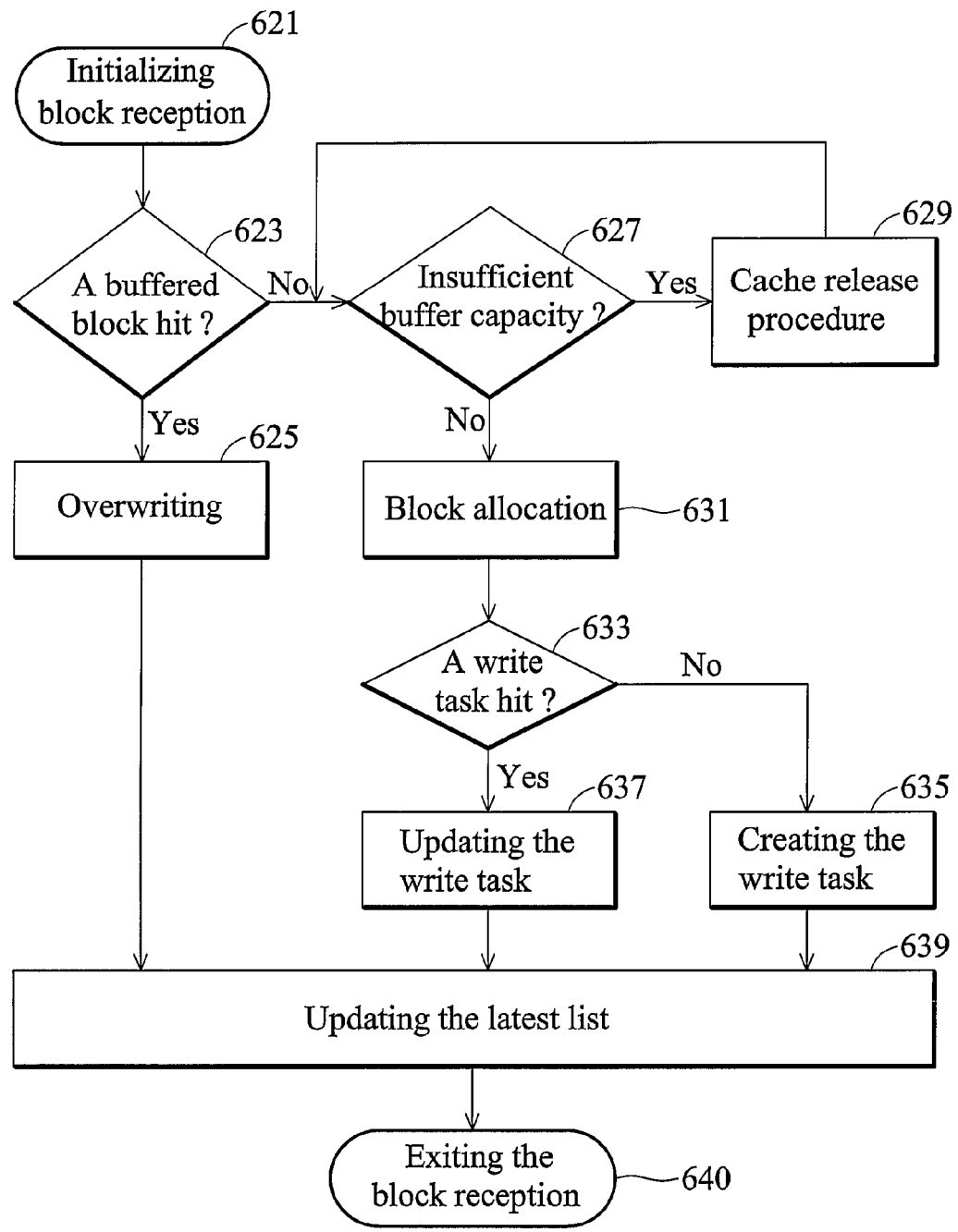
FIG. 6b is a flowchart of data block reception when perform the buffering operation.

FIG. 6b is a flowchart of data block reception when performing the buffering operation. The block reception procedure as described in step 605 of FIG. 6a is initialized in step 621 to handle an incoming write data block #$D_W$. In step 623, the processor checks the write list 136 to determine whether the incoming write data block #$D_W$ has a previous copy in the buffer 140. If so, overwriting is required, so step 625 is processed, whereby the processor overwrites the previous copy by the incoming write data block #$D_W$. Otherwise, a free block should be allocated to store the incoming write data block #$D_W$. Before allocating the free entry, capacity of the memory device 124 is checked in step 627. If there is not enough space left for further storage, a release procedure is triggered in step 629 to release more spaces for storing data. A cache policy may be previously defined, whereby the processor releases a certain blocks accordingly to acquire additional capacity. There already exist various algorithms to release cached data depending on usages such as hit rates or idle time, so detailed example is not introduced herein. After the capacity is assured available, step 627 is followed by step 631, the block allocation step. In step 631, the processor 122 acquires a free block from the free list 138 to store the incoming write data block #$D_W$.

In step 633, it is determined whether the incoming write data block #$D_W$ hits an existing disc write task. According to the write command #W transmitted with the incoming write data block #$D_W$, a particular destination address where the write data block #$D_W$ is bound to can be deduced. By checking the write list 136, the processor 122 can identify whether the particular destination address successive to or precedes whatever previously was buffered in the buffer 140. For example, if the incoming write data block #$D_W$ has a destination address consecutive to those contained in an existing disc write task, step 637 is processed, in which the existing disc write task should be updated to include the incoming write data block #$D_W$.

If the incoming write data block #$D_W$ having destination address allocated between the end of one existing disc task and the beginning of another existing disc write task, the two disc write tasks are therefore merged into one new disc write task. On the other hand, in step 635, if there is no adjacency detected, a new disc write task may be created in the write list 136 to handle the incoming write data block #$D_W$. As a supplement example, in step 625, the write list may not need an update, though, but its last access time may be refreshed in order to count tasks such as time-outs or hit rate of the disc write task. Upon completion of buffering the incoming write data block #$D_W$, a latest list 137 is also updated in step 639.

Similar to maintenance of the write list 136 and free list 138, a latest list 137 is established as a read cache, recording entries of data blocks associated with latest certain amount of received read and write commands #R and #W. As an example, the latest list 137 may utilize the described link list architecture in FIG. 5a, with additional pointers implemented in the buffer 140 to link certain write data blocks #$D_W$ and read data blocks #$D_R$. Therefore, the write list 136 and the latest list 137 are both deployed on the basis of the buffer 140. In other words, the architecture allows one buffer 140 to function as read and write caches at the same time. In step 640, the block reception is concluded.

Figure 6C:
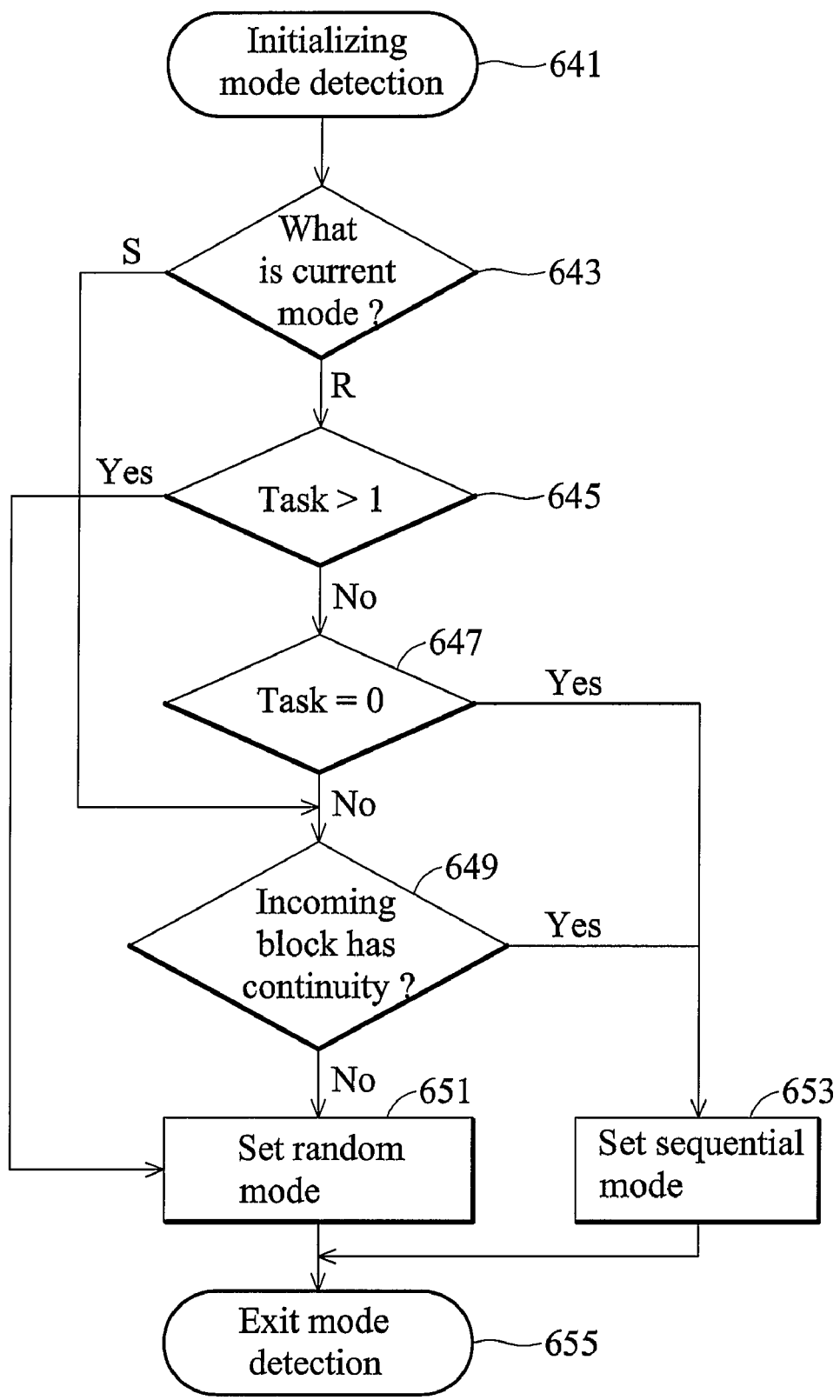
FIG. 6c is a flowchart of mode detection when perform the buffering operation.

FIG. 6c is a flowchart of mode detection when performing the buffering operation. In step 641, the mode detection procedure as described in step 607 of FIG. 6a is initialized. Various conditions are considered to decide which mode to set. In step 643, the processor 122 determines the current mode. If the current mode is the sequential mode, the process jumps to step 649. Otherwise, step 645 is processed, in which a total of disc write tasks are counted. If there are more than one disc write tasks, random mode is set in step 651. In step 647, if there is no disc write tasks left in the buffer 140, the sequential mode is set in step 653. In step 649, if there is only one disc write task left, the last write data block #$D_W$ buffered in the block reception procedure is checked whether the block belongs to the only one disc write task. If not, a new disc write task is created, so the mode should be set to random mode in step 651. In step 651, if the previous mode is sequential mode, the processor 122 creates the write list 136, the latest list 137, the free list 138 accordingly. Otherwise, step 649 is still followed by step 653. However, the buffer reception may be a continuous process, so steps 605 and 607 may be executed in parallel. In this case, whether the mode is set, should be dependent on the latest status of the buffer 140. Steps 651 and 653 are followed by step 655, in which the mode detection procedure is concluded after the mode is set. In another embodiment, in step 645, if there are one or more disc write tasks, then goes to step 651, random mode is set in step 651.

Figure 6D:
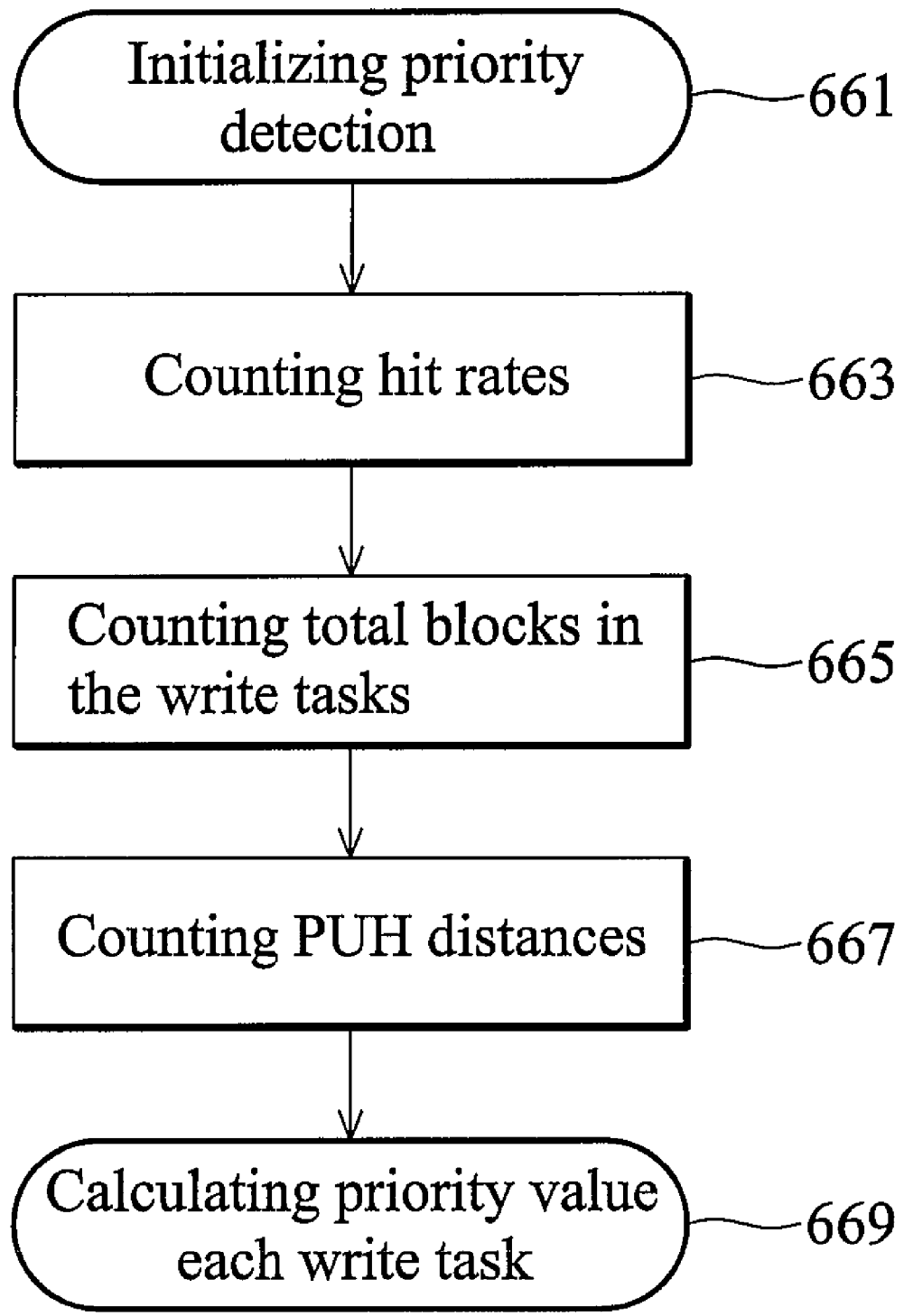
FIG. 6d is a flowchart of priority determination when perform the buffering operation.

FIG. 6d is a flowchart of priority determination when performing the buffering operation. As described in step 609 of FIG. 6a, priority calculation is required for scheduling all of the disc write tasks to determine the sequence of recording of those disc write tasks. In step 661, the priority calculation procedure is initialized. In step 663, hit rates of each disc write task are counted. Any action involved in any write data block #$D_W$ in a disc write task shall count as a hit, such as overwriting, reading or adding a write data block #$D_W$. A buffered write data block #$D_W$ may be requested by a read command #R before it being recorded, so the reading operation is also counted in the hit rate. In one embodiment, the hit rates can further be categorized into write and read types. In the write list 136, write hit rates are counted per disc write task, and for latest list 137, read hit rates may be counted per read data block #$D_R$.

In step 665, for each disc write task, the total number of data blocks is considered as a factor to determine the priority. Physically, one disc write task corresponds to one sequential recording operation for the driving module 126, in which track seeking and locking are performed once, so it is more preferable and efficient to have more data blocks recorded at one time. The counted numbers can directly indicate potential performance of a disc write task, thus is taken as a factor for establishing priority.

In step 667, distances between the currently position of the PUH and task destination area on the optical disc are also considered as a factor of their priorities. A task destination area is exactly the destination physical address of the first write data block #$D_W$ in a disc write task. When a disc write task is to be recorded, the distance the PUH moves also affects the performance. It is desirable to schedule an optimized recording operation so that the PUH moves as less as possible to complete all disc write tasks. Thus, the PUH distances are factors of their priorities. In step 669, priority value of each disc write task are calculated based on hit rates, number of data blocks #$D_W$, and PUH distances. The method to calculate these factors can be dependent on predetermined performance policies defined in firmware of the optical disc drive 120, and the implementation is not limited as described in the embodiment.

Figure 6E:
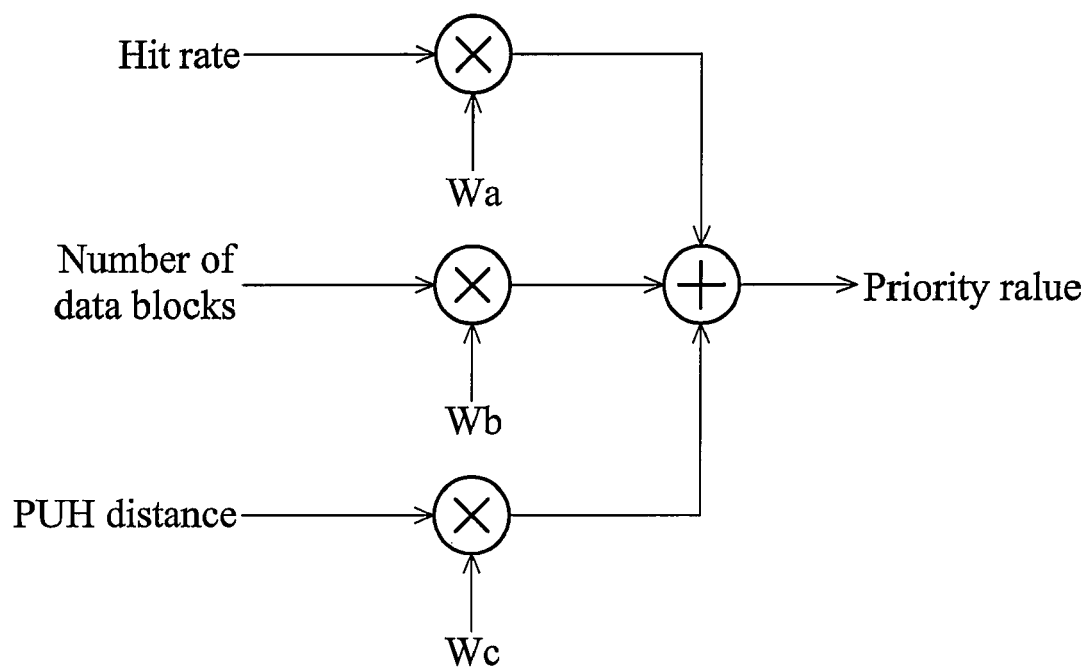
FIG. 6e is an embodiment of calculating priority value of the invention.

FIG. 6e is an embodiment of calculating priority value of the invention. The factors of hit rates, task length and PUH distances are respectively multiplied with weighting factors Wa, Wb, Wc, and then summed together to generate the priority value. The weighting factors Wa, Wb, Wc are adjustable depending on the actions of host computer 110. For example, if host computer 110 issues lots of write commands #W with consecutive destination addresses whereby number of data blocks #$D_W$ of a disc write task is big enough, the weighting factor Wb could be set up to equal to weighting factor Wc, and the weighting factor Wb may greater than weighting factor Wa. In another embodiment, the weighting factors Wa, Wb, Wc can be modified by processor 122. And the weighting factors Wa, Wb, Wc can be optimized via checking the data throughput of the optical pick head.

Figure 7:
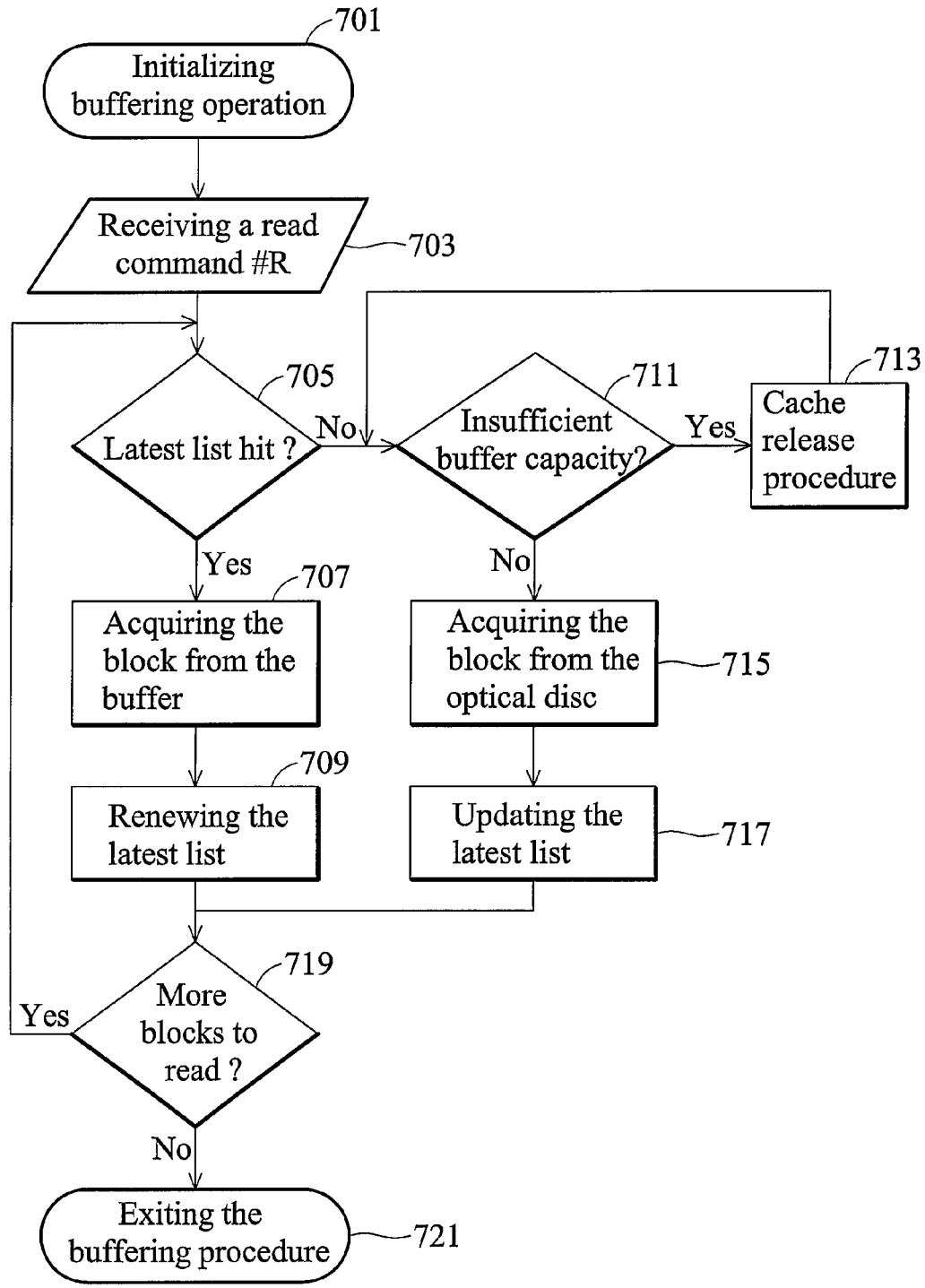
FIG. 7 is a flowchart of a read command handling process.

FIG. 7 is a flowchart of a read command handling process. In step 203 of FIG. 2b, the buffering operation is introduced, and step 603 of FIG. 6a already discussed a write command #W handling process. Alternatively the buffering operation corresponding to the read command #R is introduced in step 701. The buffering operation as step 203 is initialized in step 701. In step 703, a read command #R is received by the optical disc drive 120, requesting for a certain read data block #$D_R$ from a specific address on the optical disc. In step 705, the processor 122 first checks whether the read data block #$D_R$ is already cached in the buffer 140. Items maintained in the latest list 137 are checked, in which the read data block #$D_R$ is acquired from the buffer 140 and transferred to the host computer 110. Generally, hit rates and time-outs are factors used by cache policies. When a block is hit, its usage history such as last access time or access frequency is renewed. Therefore, after step 707, the entry corresponding to the read data block #$D_R$ in the latest list 137 is renewed in step 709.

On the other hand, if the read data block #$D_R$ is not hit in the buffer 140, it shall be directly acquired from the optical disc. In step 715, a reading operation is performed to acquire the read data block #$D_R$ from the optical disc, and stored in the buffer 140. Then in step 717, the latest list 137 is updated accordingly. Before buffering the accessed read data blocks #$D_R$, the capacity of the buffer 140 may be checked in step 711. If capacity is not enough, a cache release procedure is performed in step 713. In other word, if capacity is not enough for buffering current reading data blocks from the disc, the processor 122 would search the blocks according to the latest list 137 and the write list 136 to release the blocks that is not write data blocks. A read command #R may request more than one read data block #$D_R$, so in step 719, it is determined whether all requested read data block #$D_R$ are acquired. If not, the process loops back to step 705. Upon completion of the read data blocks acquiring read data block #$D_R$, the buffering operation is concluded in step 721.

Figure 8:
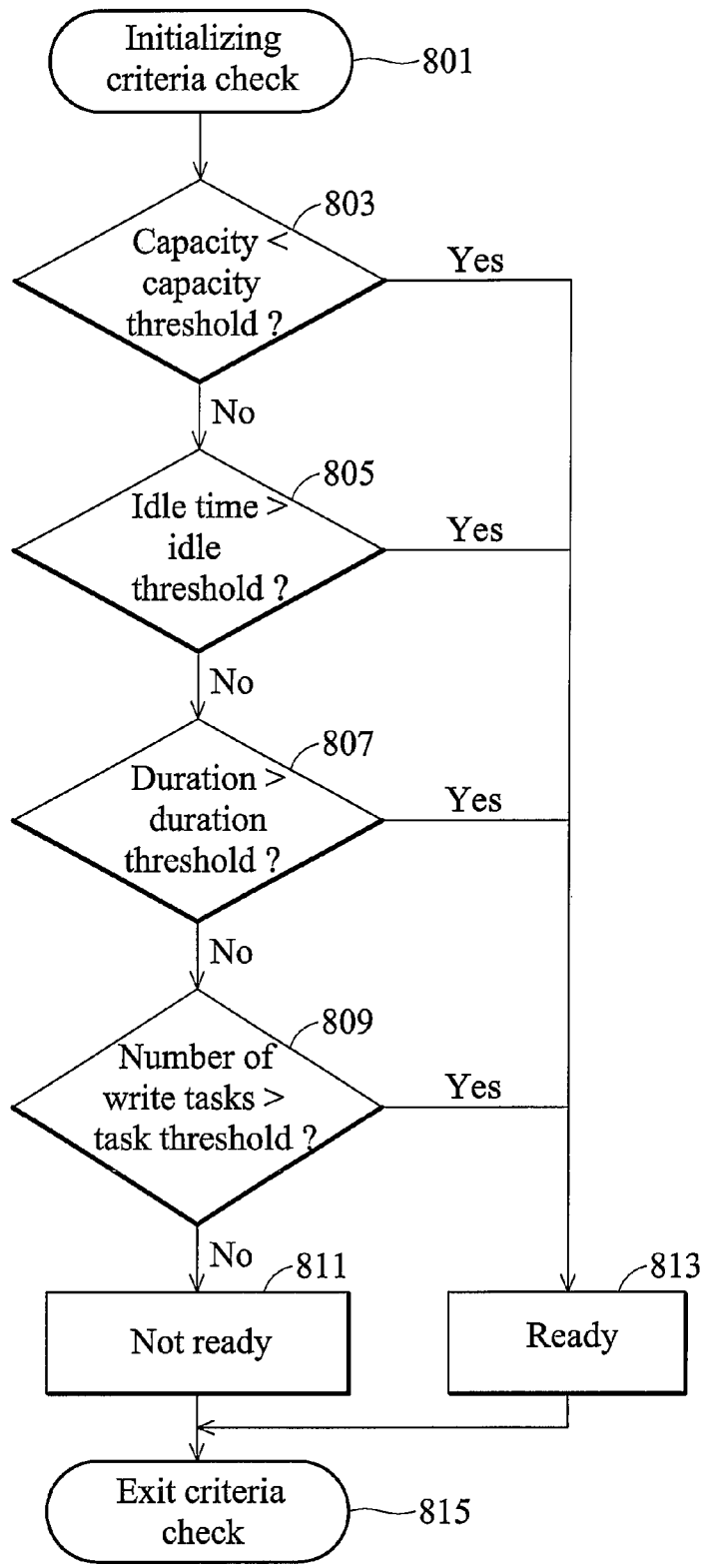
FIG. 8 is a flowchart of recording start condition determination.

FIG. 8 is a flowchart of recording start condition determination. As described in FIG. 2b, step 205 determines whether a recording operation can be initialized. The recording start condition comprises considerations of various factors, such as capacity usages of the buffer 140, an idle time since last activity of the buffer 140, duration since the last recording operation, and total number of disc write tasks.

In step 801, the recording start condition determination of step 205 is triggered. In step 803, the available capacity of the buffer 140 is compared with a capacity threshold. A recording operation may be triggered if the write data block #$D_W$ buffered therein are sufficient for recording, so the start recording condition is deemed satisfactory when the available capacity of buffer 140 is smaller than the capacity threshold, and the process jumps to step 813. In step 813, the processor determines that disc drive 120 is ready to perform the recording operation. The capacity threshold varies with mode. Generally, in random mode, it is desirable to gather more write data blocks #$D_W$ before recording because the consecutiveness may be thereby increased, so the capacity threshold is set to a smaller value in random mode than that in sequential mode.

In step 805, the idle time is compared with an idle threshold. The idle time may be specifically referred to as a period from last activity of the buffer 140, such as data buffering and data output, is conducted. In sequential mode, logically there is only one disc write task, so that the buffered write data blocks #$D_W$ are ready to be recorded at any time. In random mode, however, since the complexity of a recording operation is higher, it is desirable to wait longer to allow more write data blocks #$D_W$ to be collected. Thus, the idle threshold is set to a higher value in random mode than that in sequential mode.

In step 807, the duration since the last recording operation compares with a duration threshold. Normally, the buffered write data blocks #$D_W$ are periodically flushed into the optical disc if no other specific event occurs. The duration threshold value is also dependent on the mode. In the embodiment, the duration threshold is set to a higher value in random mode than that in sequential mode.

In step 809, the numbers of disc write tasks are counted. The number is irrelevant in sequential mode because there is only one disc write task. In random mode, however, the tasks number is proportional to randomness of the buffer 140. Also, the capacity of write list 136 may be limited to manage a certain number of disc write tasks, so a task threshold is set. When the number of disc write tasks exceeds the task threshold, the recording operation is triggered in step 813.

If all of the criterions from step 803 to 809 are not met, the processor 122, in step 811, determines that disc drive 120 is not yet ready to perform the recording operation. Then, step 815 concludes the criterion determination step.

Figure 9:
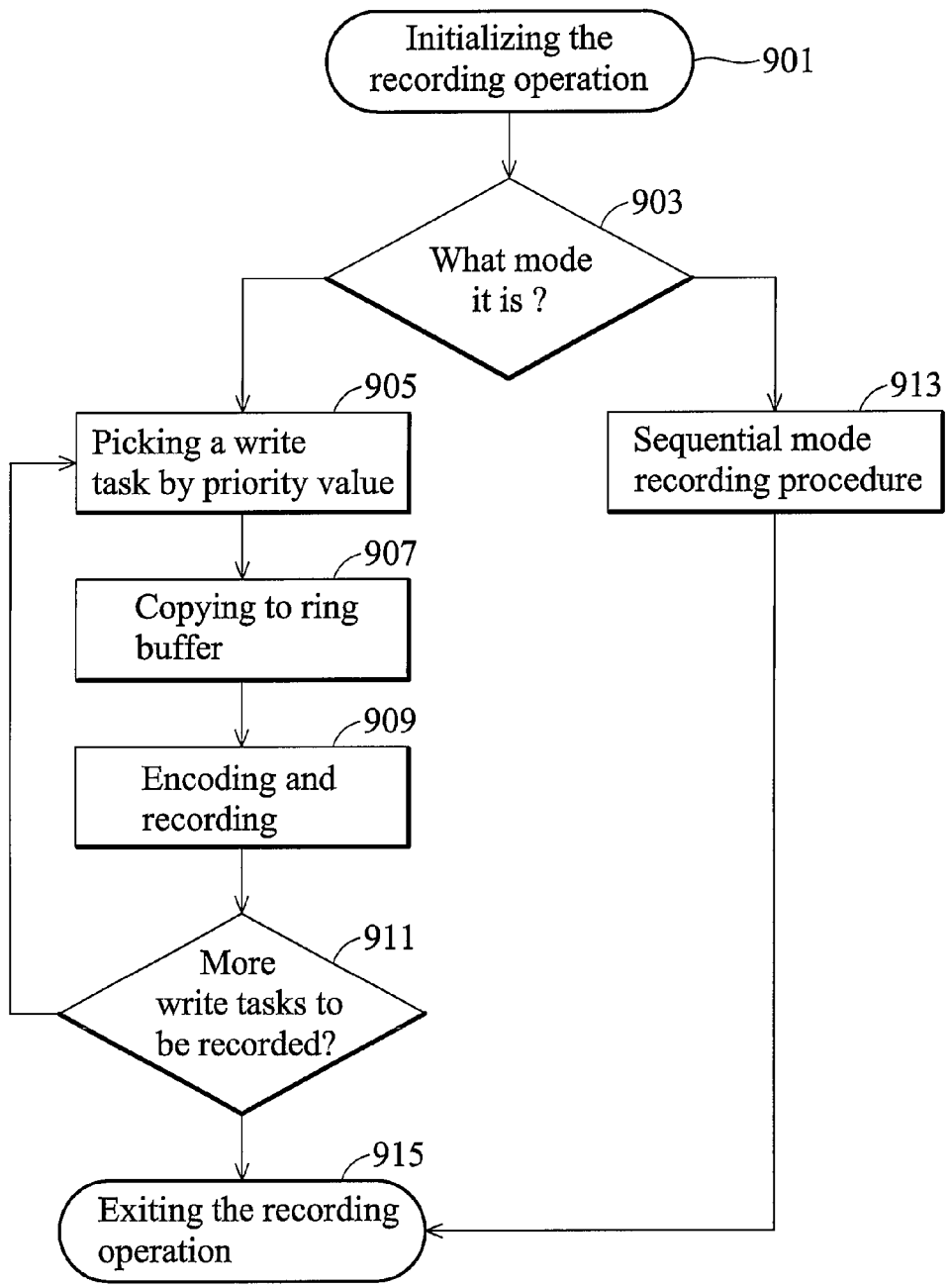
FIG. 9 is an exemplary flowchart of a recording operation.

FIG. 9 is an exemplary flowchart of a recording operation. When the buffering operation is complete, and at least one of the recording start conditions is met, the recording operation of step 203 is initialized in step 901. In step 903, the mode is detected. For sequential mode, the case is simpler, whereby a conventional sequential recording operation is performed in step 913. The buffered write data blocks #$D_W$ in the buffer 140 are recorded and flushed if no error is detected.

If the mode is random mode, the disc write tasks are handled one by one in steps 905 to 911. In step 905, a disc write task having the highest priority value is first selected for recording. In another embodiment, disc write tasks having priority value exceeding a threshold are selected for recording. And the threshold is adjustable according to the status of the buffer 140, such as available capacity of buffer 140, and/or total numbers of existing disc write tasks. If the available capacity of buffer 140 is low, the threshold should be adjusted to be lower. If the total numbers of existing disc write tasks is high, the threshold should be adjusted to be low. Step 907 is an optional step, in which a ring buffer may be provided in the memory device 124 as a second level cache. Write data blocks #$D_W$ of the selected disc write task to be recorded may be copied to the ring buffer whereby further steps are processed. Alternatively, the ring buffer may not be necessary, and the write data blocks #$D_W$ are directly processed in the buffer 140. In step 909, the write data blocks #$D_W$ are individually encoded into error correction code (ECC) blocks and sequentially recorded onto destination area of the optical disc. The encoding of the ECC blocks varies with standards, and detailed information is well know for the person skilled in the art, so the embodiments are not described herein.

In step 911, upon completion of a disc write task, the processor 122 determines whether more disc write tasks are to be processed. If so, the process loops to step 905 to select and process a disc write task of highest priority among the unprocessed ones. If all disc write tasks are done, the recording operation is concluded in step 915.

In step 909, when recording the write data blocks #$D_W$, defects may be found on the optical disc where data could not be correctly recorded. Conventionally, write data blocks #$D_W$ are written one by one. When a defect is found at where a write data block #$D_W$ should be recorded, the PUH moves to a spare area to record the write data block #$D_W$, and moves back to an address successive to the defected address to recorded further write data blocks #$D_W$. Alternatively, when defects are detected, the write data blocks #$D_W$ are copied to another buffer, and another disc write task should be scheduled to rewrite them.

Figure 10:
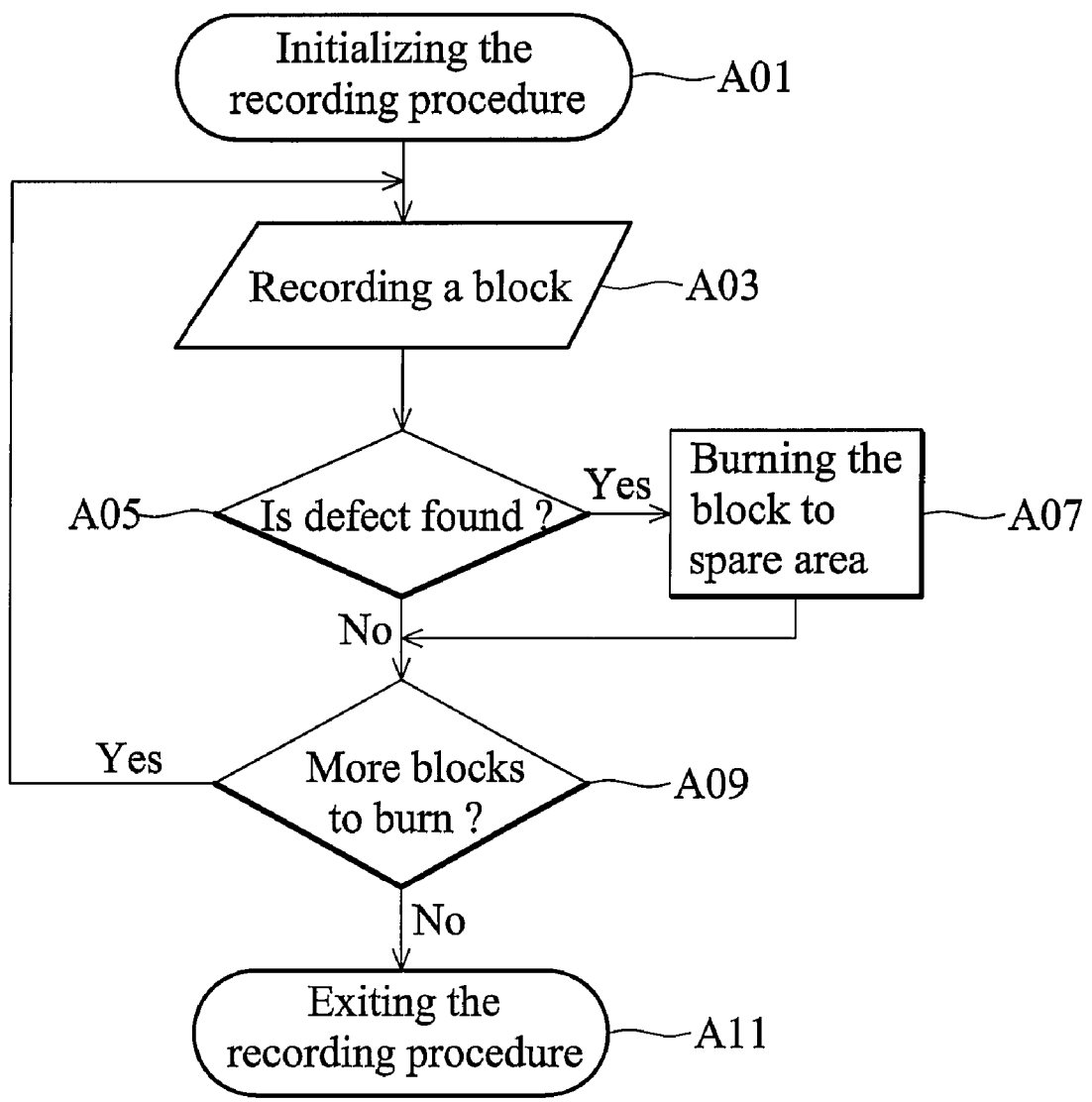
FIG. 10 is a flowchart of a conventional defect handling process.

FIG. 10 is a flowchart of a conventional defect handling process. In step A01, a recording procedure for a disc write task is initialized. Write data blocks #$D_W$ of a disc write task are sequentially processed through steps A03 to A09. In step A03, one write data block #$D_W$ is recorded to the optical disc, and in step A05, the recorded write data block #$D_W$ are checked. If an error is found, step A07 is processed, in which the PUH moves to a spare area to rewrite the write data block #$D_W$. Alternatively, the write data block #$D_W$ may be copied to another buffer and wait for rewriting. The spare area is preserved space for defect management during recording procedure, and the implementation varies with standards. When the write data block #$D_W$ is successfully recorded onto the spare area, the PUH moves back to a successive address where the defect is detected to process a next write data block #$D_W$. In step A09, it is determined whether all write data blocks #$D_W$ in the disc write task are recorded. If not, the process loops to step A03. Otherwise, the recording procedure is concluded in step A11.

Obviously, step A07 becomes a performance bottleneck because when the PUH moves to and from the spare area. If defects are multiple, complex mechanical burdens are induced by frequent track seeking and locking, therefore seriously degrade the performance. Alternatively, additional buffer spaces may be consumed to buffer the write data blocks #$D_W$ in need of rewriting.

Figure 11:
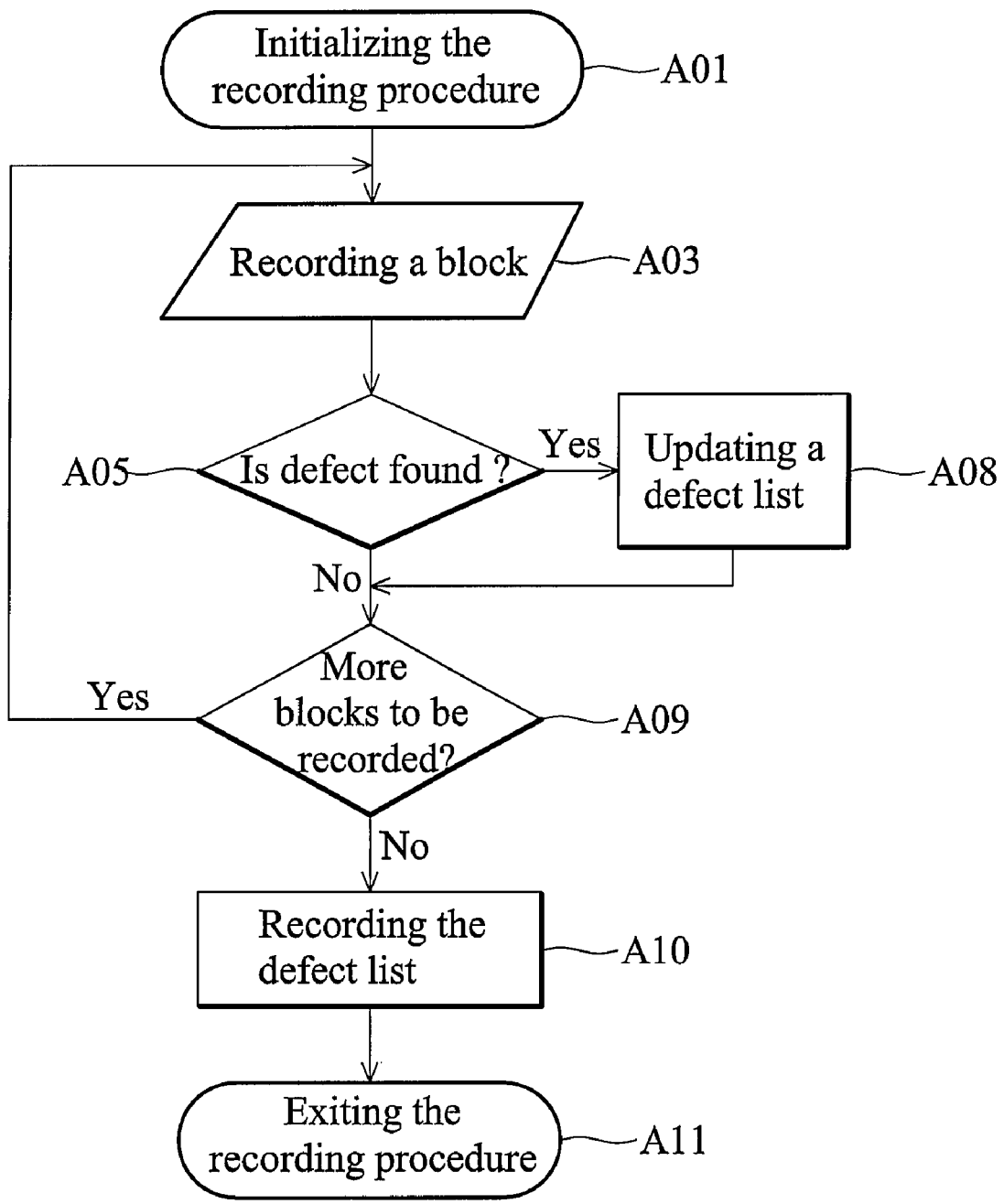
FIG. 11 is a flowchart of an embodiment of a defect handling process.

To improve inefficient design, a defect list 139 is provided in the invention to maintain blocks of failed to be recorded onto the optical disc. FIG. 11 is a flowchart of an embodiment of a defect handling process. Steps A01, A03 and A05 are similar to those in FIG. 10, whereby a write data block #$D_W$ is recorded and verified. In step A08, if a defect is found on the destination area, the PUH is not moved to the spare area. On the contrary, the processor 122 adds the block of the write data block #$D_W$ to the defect list 139. Thereafter, steps A09 is proceeded, continuing to process all of the write data block #$D_W$ in the disc write task. In this way, the PUH continuously processes all write data blocks #$D_W$ of a disc write task without interruption and overheads induced by moving to and from the spare area. All the write data blocks #$D_W$ failing to be recorded due to defects are collected in the defect list 139 to form an extra disc write task. The write data blocks #$D_W$ failed to record on their destination area are reallocated to the spare area with continuity. In step A10, an additional recording operation as step 909 can be triggered to record the write data blocks #$D_W$ to the spare area according to the extra disc write task. Thereafter, the recording procedure is concluded in step A11. In this way, no matter how bad the optical disc is damaged, continuity of the recording operation is almost unaffected.

Figure 12:
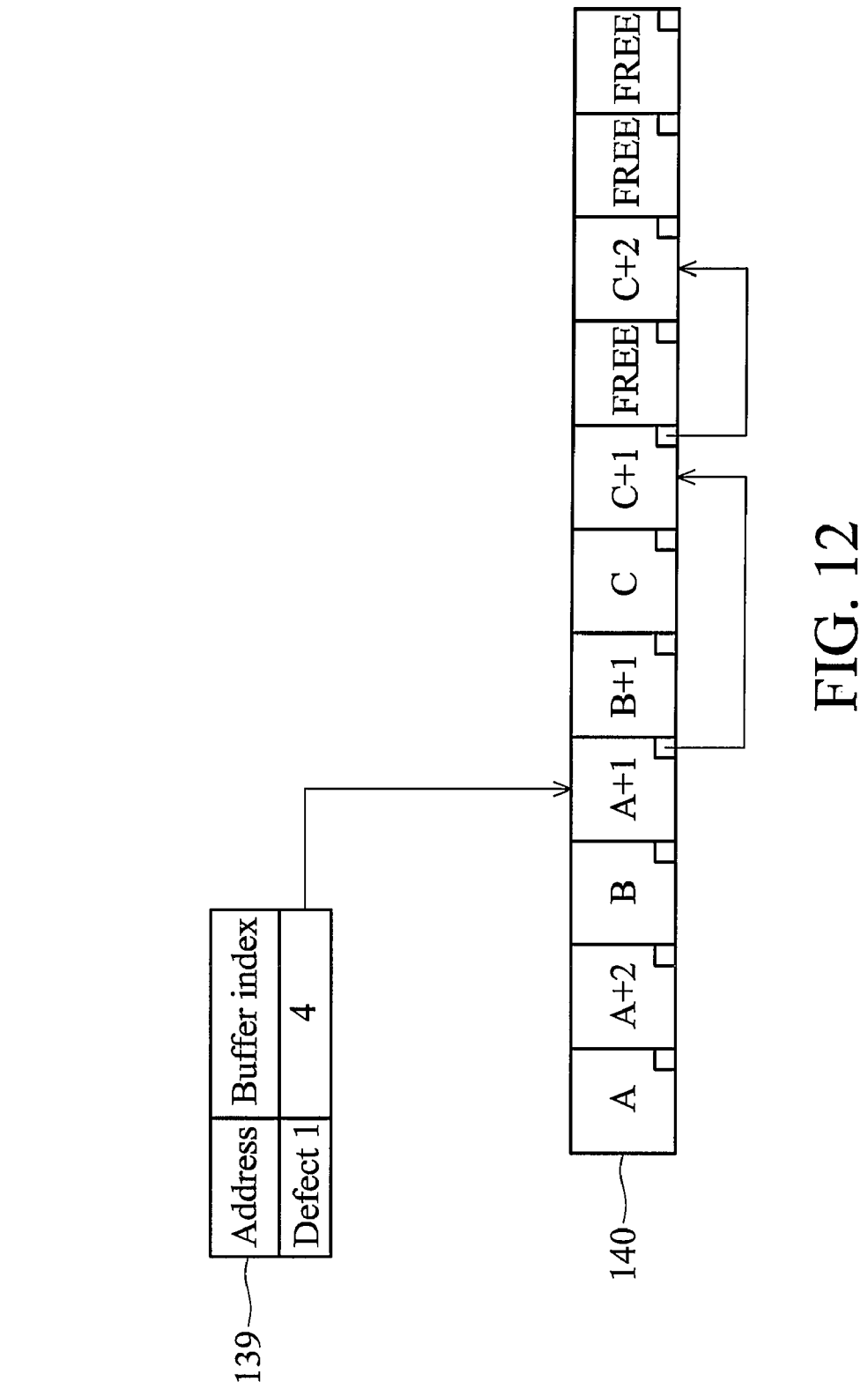
FIG. 12 shows and embodiment of a defect list.

FIG. 12 shows and embodiment of a defect list 139. The link list structure may also be used to construct the defect list 139. When a defect is found at address A+1, the defect list 139 creates an entry pointing to the write data block #$D_W$ of A+1. Thereafter, another defect is found when recording a write data block #$D_W$ to C+1, and the defect list 139 links the write data block #$D_W$ of address A+1 to the write data block #$D_W$ of address C+1. Yet, C+2 is found defective, so the link list is further extended. Although the concept of a link list is visualized as FIG. 12, a practical implementation may not need to be identical to what is shown.

In the embodiments, a so called data block may have a basic unit in sectors or clusters, which are not exactly limited. The write list 136, latest list 137, free list 138 and defect list 139 may be stored in the memory device 124 or other devices. While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical disc drive, operative to receive a plurality of write commands, each write command comprising a data block and a destination address, comprising:
   a buffer, buffering the data blocks to be recorded to an optical disc in either a random mode or a sequential mode;
   a processor, analyzing arrangements of the data blocks buffered in the buffer, generating a plurality of disc write tasks, wherein each disc write task is generated for a subset of the data blocks having consecutive destination addresses, scheduling a recording operation based on the disc write tasks, counting a total number of the generated disc write tasks as a task number, and selectively switching the buffer to the random mode or to the sequential mode based on the task number; and
   a driving module, controlled by the processor to perform the recording operation to record the data blocks to the optical disc when a start recording condition is met; wherein the start recording condition varies with the random or sequential modes.

2. The optical disc drive as claimed in claim 1, wherein when the task number exceeds one, the buffer is switched to the random mode.

3. The optical disc drive as claimed in claim 1, wherein when the task number is zero, the buffer is switched to the sequential mode.

4. The optical disc drive as claimed in claim 1, wherein when the task number is one, the processor determines whether an incoming write command has a destination address consecutive to those in the disc write task, if so, the buffer is switched to the sequential mode, otherwise the random mode.

5. The optical disc drive as claimed in claim 1, wherein the start recording condition comprises buffer fullness, an idle time from last activity of the buffer, duration since the last recording operation was performed, or total number of disc write tasks.

6. The optical disc drive as claimed in claim 5, wherein:
   in the random mode, the start recording condition is met when the processor determines the buffer fullness is smaller than a first capacity threshold;
   in the sequential mode, the start recording condition is met when the processor determines the buffer fullness is smaller than a second capacity threshold; and
   the first capacity threshold is smaller than the second capacity threshold.

7. The optical disc drive as claimed in claim 5, wherein:
   in the random mode, the start recording condition is met when the processor determines the idle time exceeds a first idle threshold;
   in the sequential mode, the start recording condition is met when the processor determines the idle time exceeds a second idle threshold; and
   the first idle threshold is larger than the second idle threshold.

8. The optical disc drive as claimed in claim 5, wherein:
   in the random mode, the start recording condition is met when the processor determines the duration exceeds a first duration threshold;
   in the sequential mode, the start recording condition is met when the processor determines the duration exceeds a second duration threshold; and
   the first duration threshold is larger than the second duration threshold.

9. A buffer management method, adaptable in an optical disc drive to access an optical disc, comprising:
   receiving a plurality of write commands, each write command comprising a data block and a destination address;
   buffering the data blocks to be recorded to the optical disc in either a random mode or a sequential mode;
   analyzing arrangements of the data blocks buffered in the buffer;
   generating a plurality of disc write tasks, wherein each disc write task is generated for a subset of the data blocks having consecutive destination addresses into;
   scheduling a recording operation based on the generated disc write tasks;
   counting a total number of the generated disc write tasks as a task number;
   selectively switching the buffer to the random mode or to the sequential mode based on the task number; and
   performing the recording operation to record the data blocks to the optical disc when a start recording condition is met; wherein the start recording condition varies with the random or sequential modes.

10. The buffer management method as claimed in claim 9, further comprising, when the task number exceeds one, switching the buffer to the random mode.

11. The buffer management method as claimed in claim 9, further comprising, when the task number is zero, switching the buffer to the sequential mode.

12. The buffer management method as claimed in claim 9, further comprising, when the task number is one, determining whether an incoming write command has a destination address consecutive to those in the disc write task, if so, switching the buffer to the sequential mode, otherwise the random mode.

13. The buffer management method as claimed in claim 9, wherein the start recording condition comprises buffer fullness, an idle time from last activity of the buffer, duration since the last recording operation was performed, or the task number.

14. The buffer management method as claimed in claim 13, further comprising:
- in the random mode, when the buffer fullness is smaller than a first capacity threshold, deeming the start recording condition to be met;
- in the sequential mode, when the buffer fullness is smaller than a second capacity threshold, deeming the start recording condition to be met, wherein the first capacity threshold is smaller than the second capacity threshold.

15. The buffer management method as claimed in claim 13, further comprising:
- in the random mode, when the idle time exceeds a first idle threshold, deeming the start recording condition to be met;
- in the sequential mode, when the idle time exceeds a second idle threshold, deeming the start recording condition to be met, wherein the first idle threshold is larger than the second idle threshold.

16. The buffer management method as claimed in claim 13, further comprising:
- in the random mode, when the duration exceeds a first duration threshold, deeming the start recording condition to be met;
- in the sequential mode, when the duration exceeds a second duration threshold, deeming the start recording condition to be met, wherein the first duration threshold is larger than the second duration threshold.

* * * * *